(12) United States Patent
Colle et al.

(10) Patent No.: US 7,707,432 B2
(45) Date of Patent: Apr. 27, 2010

(54) ENABLING COMMUNICATION BETWEEN AN APPLICATION PROGRAM AND SERVICES USED BY THE APPLICATION PROGRAM

(75) Inventors: Renzo Colle, Rastatt (DE); Daniel Zoch, Walldorf (DE)

(73) Assignee: SAP AG, Walldorf (DE)

( * ) Notice: Subject to any disclaimer, the term of this patent is extended or adjusted under 35 U.S.C. 154(b) by 1396 days.

(21) Appl. No.: 10/917,443

(22) Filed: Aug. 13, 2004

(65) Prior Publication Data

US 2006/0036867 A1 Feb. 16, 2006

(51) Int. Cl.
*G06F 9/00* (2006.01)
(52) U.S. Cl. ...................................... 713/192; 713/193
(58) Field of Classification Search .................. 713/192, 713/193
See application file for complete search history.

(56) References Cited

U.S. PATENT DOCUMENTS

| | | | |
|---|---|---|---|
| 4,714,995 A | 12/1987 | Materna et al. |
| 5,701,423 A | 12/1997 | Crozier |
| 5,721,912 A | 2/1998 | Stepczyk et al. |
| 5,778,373 A | 7/1998 | Levy et al. |
| 5,870,605 A | 2/1999 | Bracho et al. |
| 5,870,765 A | 2/1999 | Bauer et al. |
| 5,873,096 A | 2/1999 | Lim et al. |
| 6,202,099 B1 | 3/2001 | Gillies et al. |
| 6,226,649 B1 | 5/2001 | Bodamer et al. |
| 6,256,676 B1 | 7/2001 | Taylor et al. |
| 6,339,795 B1 | 1/2002 | Narurkar et al. |
| 6,446,092 B1 | 9/2002 | Sutter |
| 6,604,140 B1 | 8/2003 | Beck et al. |
| 6,871,224 B1 | 3/2005 | Chu et al. |
| 7,080,092 B2 | 7/2006 | Upton |
| 7,152,204 B2 | 12/2006 | Upton |

(Continued)

FOREIGN PATENT DOCUMENTS

EP 0 592 045 4/1994

(Continued)

OTHER PUBLICATIONS

Urban, S.D., et al., Interconnection of Distributed Components: An Overview of Current Middleware Solutions, Journal of Computing and Information Science in Engineering, vol. 1, Mar. 2001, pp. 23-31.

(Continued)

*Primary Examiner*—Thomas R Peeso
(74) *Attorney, Agent, or Firm*—Fish & Richardson P.C.

(57) ABSTRACT

Communicating between multiple application programs includes providing an adapter to a first computer application for use in accessing a second computer application that provides a function to the first computer application. The inputs and outputs of the function are defined by the first computer application. The adapter is made available to the first computer application for use in accessing the second computer application. The adapter is configured to accept from the first computer application the inputs to the function and provide to the second computer application the inputs in a form that the second computer application is able to use. The adapter is configured to receive from the second computer application outputs from the function and provide to the first computer application the outputs in a form that the first computer application is able to use.

22 Claims, 10 Drawing Sheets

U.S. PATENT DOCUMENTS

| | | |
|---|---|---|
| 7,181,731 B2 | 2/2007 | Pace et al. |
| 2002/0038309 A1 | 3/2002 | Perkins et al. |
| 2002/0038336 A1 | 3/2002 | Abileah et al. |
| 2003/0093402 A1 | 5/2003 | Upton |
| 2003/0093403 A1 | 5/2003 | Upton |
| 2003/0093470 A1 | 5/2003 | Upton |
| 2003/0105884 A1 | 6/2003 | Upton |
| 2003/0110315 A1 | 6/2003 | Upton |
| 2003/0120771 A1 | 6/2003 | Laye et al. |
| 2003/0172125 A1 | 9/2003 | Batra et al. |
| 2004/0078373 A1 | 4/2004 | Ghoneimy et al. |
| 2005/0149941 A1 | 7/2005 | Watson et al. |

FOREIGN PATENT DOCUMENTS

| | | |
|---|---|---|
| WO | WO 93/04436 | 3/1993 |
| WO | WO 00/79408 | 12/2000 |
| WO | WO 01/27806 | 4/2001 |
| WO | WO 02/091240 | 11/2002 |

OTHER PUBLICATIONS

Gray et al., The Dangers of Replication and a Solution, ACM SIGMOD Record, Jun. 1996, pp. 173-182.

Huston et al., Disconnected Operation for AFS, Proceedings of the USENIX Mobile and Location-Independent Computing Symposium, Cambridge, MA, Aug. 2-3, 1993, USENIX Association, pp. 1-10.

Office Action dated Nov. 15, 2007 from copending U.S. Appl. No. 10/917,398, 19 pages.

Kwak et al. "A Framework Supporting Dynamic Workflow Interoperation and Enterprise Application Integration", 2002 IEEE, pp. 1-8.

Iwasaki et al. "Distributed Adapter Technology for Enterprise Network Operations Support", 2002 IEEE, pp. 875-877.

Xiong et al. "Middleware-based Solution for Enterprise Information Integration", 2001 IEEE, pp. 687-690.

ENABLING COMMUNICATION BETWEEN AN APPLICATION PROGRAM AND SERVICES USED BY THE APPLICATION PROGRAM

TECHNICAL FIELD

This description relates to a framework for enabling communication between an application and a service used by the application

BACKGROUND

A business enterprise may use various application programs running on one or more computer systems to manage and process business data. Application programs may be used for processing business transactions, such as taking and fulfilling customer orders, providing supply chain and inventory management, performing human resource management functions, and performing financial management functions. Application programs also may be used for analyzing data, including analyzing data obtained through transaction processing systems.

The application programs may access and use one or more services that provide specific functions to the application programs. For example, the services may provide information describing the organization of the business enterprise to the application programs. The services typically define and provide interfaces that indicate how the application programs may use the services. In such cases, the application programs use the services as defined by the interfaces to obtain the functions. When the services are replaced, changed, or maintained, the services may not be accessible to the application programs, and the interfaces to the services may change. As a result, attempts by the application programs to access and use the services may result in errors in the application programs.

Similarly, the services may access and use one or more other application programs that provide specific functions to the services. For example, one of the services may be a web service or some other service that is accessible to external users to expose the external users to aspects of the application program that uses the service. The application programs typically define and provide interfaces that indicate how the services may use the functions provided by the application programs. In such cases, the services must use the application programs as defined by the interfaces to obtain the functions. When the application programs are replaced, changed, or maintained, the application programs may not be accessible to the services, and the interfaces to the application programs may change. As a result, attempts by the services to access and use the application programs may result in errors in the application programs.

SUMMARY

An application program is used to accomplish a business function for a business enterprise. For example, an application program may be used to accomplish a sales or customer service function for the business enterprise. An application program typically is used by multiple users and includes complex processing logic to accomplish the business function. In order to accomplish the business function, the application program may use one or more discrete services. Each of the services performs a specific service function that is needed by the application program to accomplish an aspect of the business function. An application program and a service each may be referred to as a computer application.

In general, a service may include less complex processing than an application program. A service also may be more context-independent in that the service may be applicable to many different business contexts. In some implementations, a service is only programmatically accessible—that is, a service may be configured to receive inputs only from another computer application and not from a user. In contrast, an application program may be applicable to a particular business context. In some implementations, an application program is an end-user application program that is accessible to a user—that is, an end-user application program may be configured to receive inputs from a user. An end-user application program also may be configured to receive inputs from another computer program as well as from a user. In one example, a service may perform a specific sales calculation needed by a sales application program when completing a sale. The sales application program may be designed or configured for use in a particular industry or to implement one of several sales processes. As another example, a service may retrieve account information for a customer to be used by a customer service application program of the business enterprise. The service and application program both may be a part of an integrated computing process that requires the functions of the service and application program.

In order to provide the service functions to the application programs, the services may use one or more application programs that provide application program functions to the services. The application programs used by the services may be the same application programs that use the services to accomplish business functions. In general, services perform service functions that are smaller in scope than the business functions accomplished by the application programs, and application programs perform application program functions that are even smaller in scope than the service functions.

Services may be used by multiple application programs that are operated by the business enterprise. Maintaining, modifying, or replacing a service that is used by the multiple application programs may change the interface to the service. As a result, each of the multiple application programs may need to be modified to conform to the changed interface to the service. In order to allow the services to be maintained, modified, or replaced freely without necessitating the modification of the application programs that use the services, service adapters are used to provide the application programs with stable interfaces to the services. A service adapter implements an application/service interface to a corresponding service that has been defined by an application program that uses the corresponding service. The service adapter is interposed between the application program and the corresponding service to map the application/service interface to the interface provided by the corresponding service. When the interface provided by a service is changed, service adapters that correspond to the service are modified to map application/service interfaces specified by application programs that use the service to the new interface provided by the service such that the application programs may continue to use the service as defined in the application/service interfaces.

Similarly, application programs providing application program functions to the services may be used by multiple services. Maintaining, modifying, or replacing an application program that is used by the multiple services may change the interface to the application program. As a result, each of the multiple services may need to be modified to conform to the changed interface to the application program. In order to allow the application programs to be maintained, modified, or replaced freely without necessitating the modification of the services that use the application programs, application adapters are used to provide the services with stable interfaces to the application programs. An application adapter implements an application/service interface to a corresponding application program that has been defined by a service that uses the corresponding application program. The application adapter is interposed between the service and the corresponding application program to map the application/service interface to the interface provided by the corresponding application program. When the interface provided by an application program is changed, application program adapters that correspond to the application program are modified to map application/service interfaces specified by the application program that provides the new interface such that the services may continue to use the application program as defined in the application/service interfaces.

The services may be exposed to and used by entities external to the business enterprise that developed the service. For example, application programs operated by the external entities, or the external entities themselves, may use the service functions provided by the services, and the services may access other application programs to be provided with application program functions from the other application programs and to provide the service functions to the external application programs or to the external entities.

In one general aspect, communicating between multiple application programs includes providing an adapter to a first computer application for use in accessing a second computer application that provides a function to the first computer application. One or more inputs and one or more outputs of the function are defined by the first computer application. The adapter is provided to the first computer application based on an association of the first computer application with the function. The adapter is associated with the second computer application and accepts from the first computer application the one or more inputs to the function. The adapter also provides to the second computer application the one or more inputs in a form that the second computer application is able to use, receives from the second computer application one or more outputs from the function, and provides to the first computer application the one or more outputs in a form that the first computer application is able to use.

Implementations may include one or more of the following features. For example, the adapter may be a service adapter, and the function may be a type of service. The first computer application may be an end-user application that is operable to receive inputs from a user, and the second computer application may be a service that is operable to receive inputs only from another computer application.

The adapter may be an application adapter. The first computer application may be a service that is operable to receive inputs only from another computer application, and the second computer application may be an end-user application that is operable to receive inputs from a user.

The first computer application and the second computer application both may be part of an integrated computing process. The adapter may be provided to the first computer application in response to a request from the first computer application for the function. The request from the first computer application for the function may be a request from the first computer application for a function identified by a function identifier or a function identified by the one or more inputs to the function and the one or more outputs from the function.

The first computer application may define the one or more inputs to the function and the one or more outputs from the function as an interface for the function.

A second adapter may be provided to the first computer application. The second adapter may be associated with a third computer application and may accept from the first computer application the one or more inputs to the function. The second adapter also may provide to the third computer application the one or more inputs in a form that the third computer application is able to use. The second adapter also may receive from the third computer application the one or more outputs from the function and may provide to the first computer application the one or more outputs in a form that the first computer application is able to use. The second adapter may be provided to the first computer system based on an association of the first computer system with the function.

The second computer application may be one of multiple computer applications operable to provide the function. The adapter may be made available to the first computer system in lieu of a second adapter associated with a third computer application operable to provide the function.

A generic adapter may be provided to the first computer application. The first computer application may be operable to transform the generic adapter to an interface such that the first computer application is able to use the transformed adapter to access the second computer application. The first computer application may be operable to transform the generic adapter by casting an adapter based on a generic adapter object to an adapter object such that the first computer is able to use the cast adapter object to access the second computer application.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DESCRIPTION OF DRAWINGS

Like reference symbols in the various drawings indicate like elements.

DETAILED DESCRIPTION

A service adapter framework enables an application program to access and use one or more services of specific types. Each type of service provides a specific function to the application program. The application program defines an interface to each of the types of services that indicates how the application program desires to use each of the types of services to be provided with the corresponding functions. Each implementation of a service has a corresponding service adapter that implements the corresponding interface defined by the application program. The service adapter is interposed between the application program and the service to enable the application program to use the service as defined in the interface. The service adapter enables the service to be changed, maintained, or replaced without detection by the application program. The service adapter framework may include an adapter manager through which the application program identifies and accesses a service adapter corresponding to a service that provides a desired function to the application. The adapter manager makes an appropriate service adapter accessible to the application program in response to a request for a corresponding type of service from the application program.

Alternatively or additionally, the application program may define an interface to a service that indicates how the application program may be used by the service. The interface may be implemented by an application adapter that enables the service to use the application program. The application adapter is interposed between the service and the application program to enable the service to use the application program as defined in the interface. The application adapter enables the application program to be changed, maintained, or replaced without detection by the service. The application adapter framework may include an adapter manager through which the service identifies and accesses an application adapter corresponding to an application program that provides a desired function to the service. The adapter manager makes an appropriate application adapter accessible to the service in response to a request for a corresponding type of application program from the service.

The service adapter framework may be used both to enable application programs to use services with service adapters and to enable services to use application programs with application adapters. In such a case, the service adapter framework may be referred to as an application adapter framework. The application adapter framework also may be used only to enable services to use application programs with application adapters without enabling application programs to use services with service adapters.

Figure 1A:
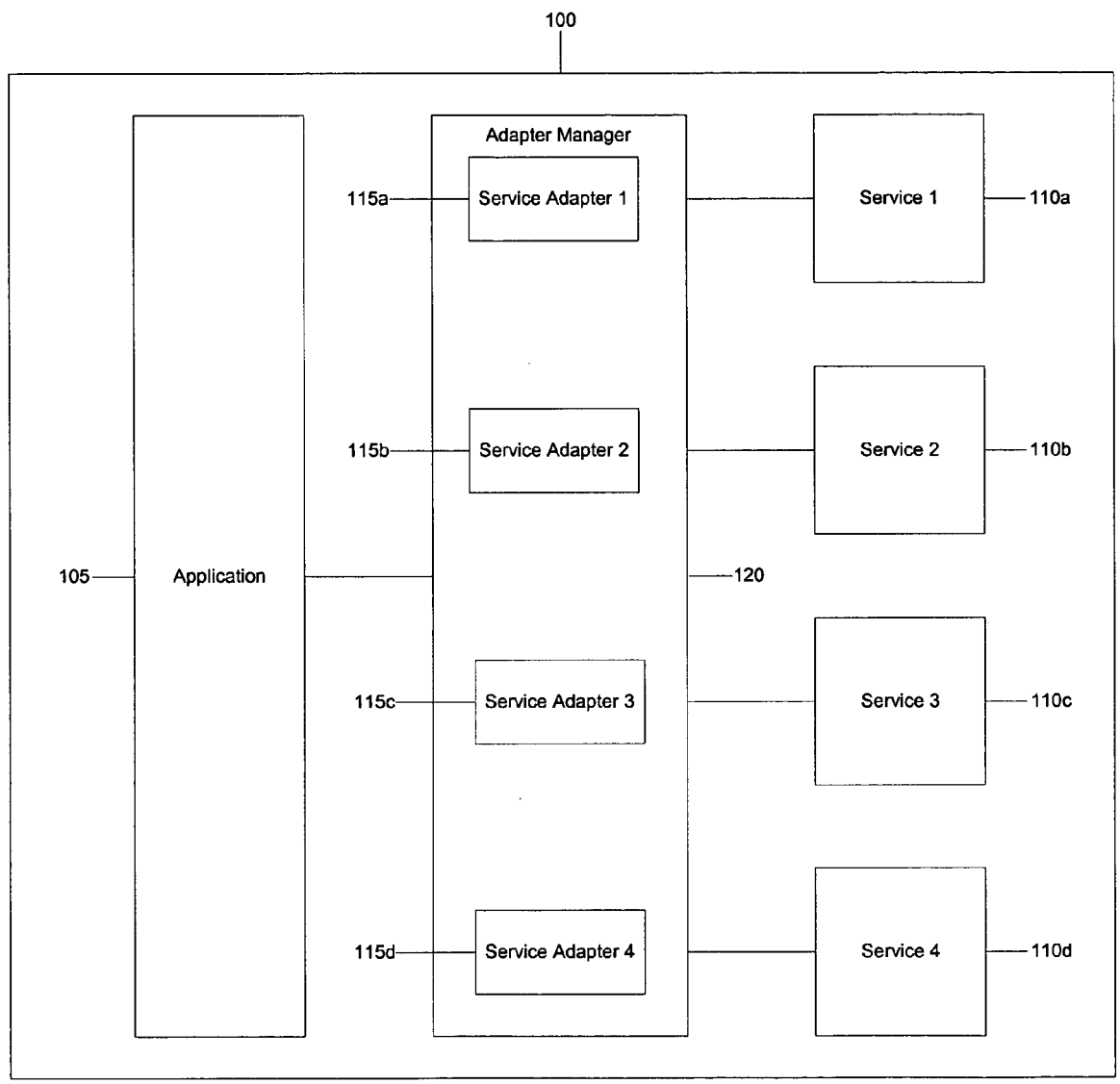
FIG. 1A is a block diagram of a framework for enabling an application program to use multiple services.

FIG. 1A is block diagram of a computer system 100 in which an application program 105 is enabled to use multiple services 110$a$-110$d$. Each of the services 110$a$-110$d$ provides a specific function to the application program 105. Service adapters 115$a$-115$d$ enable the application program 105 to use the services 110$a$-110$d$, respectively. An adapter manager 120 controls and maintains the service adapters 115$a$-115$d$.

The application program 105, which is also referred to as an application, may be used by a business enterprise to accomplish a business function for the business enterprise. The application 105 includes instructions for one or more application program functions, each of which provides an aspect of the business function accomplished by the application 105. The instructions of the application 105 are executed on a computer system that is used for accomplishing the corresponding business function. The application 105 may be used for processing business transactions, such as taking and fulfilling customer orders, providing supply chain and inventory management, performing human resource management functions, and performing financial management functions. The application programs 105 also may be used for analyzing data, including analyzing data obtained through transaction processing systems.

The services 110$a$-110$d$ may be any computer program or system that performs a service function needed by the application 105. The services 110$a$-110$d$ may represent multiple implementations of a single type of service, implementations of different types of services, or some combination thereof. Multiple implementations of a single type of service each provide the same service function to the application 105. As such, the multiple implementations may be used interchangeably by the application 105 to perform the service function. On the other hand, implementations of different types of services provide different service functions to the application 105 and may not be used interchangeably by the application 105.

Each of the services 110$a$-110$d$ includes instructions for providing a corresponding service function to the application 105. More particularly, the application 105 may use one of the service functions to provide an aspect of the business function. For example, instructions of the application 105 may call for the execution of the instructions of one of the services 110$a$-110$d$ so as to provide the corresponding service function in order to accomplish the business function. The instructions of the services 110$a$-110$d$ are executed on a computer system that is used for accomplishing the corresponding service function.

In addition, one or more of the services 110$a$-110$d$ may use the application 105 while providing corresponding service functions to the application 105. For example, one of the application program functions provided by the application 105 may be needed by the service 110$a$ to provide the corresponding service function to the application 105. As a result, execution of the instructions of the services 110$a$-110$d$ may call for execution of certain instructions of the application 105.

The services 110$a$-110$d$ may be, for example, technical services or tools, business service engines, and business execution engines. Technical services include a master data management service, an organizational data management service, a configuration data management service, a status management service, a document flow service, a quantity offsetting service, a post-processing framework, a text management service, an address management service, a validation service, a field control service, or an authority checking service. The document flow service controls the flow of documents, such as sales orders, delivery orders, and invoices that are stored independently of each other, in a process. The quantity offsetting service calculates the difference between the number of pieces ordered and the number of pieces delivered to identify the number of pieces that remain to be delivered. The post-processing framework is an event handler that triggers follow-up events to be performed in a process. The field control service identifies what fields are in a window, what hidden fields are in a window, and what fields are changeable by a user. Business service engines include a scheduling service, an available-to-promise (ATP) service, a foreign trade server, a dangerous goods management service, a serial number management service, a batch management service, or a quality management service. Business execution engines may include a handling unit management service, a lean inventory management engine, an adaptive inventory management engine, or a warehouse management engine. As would be recognized by one of skill in the art, the application 105 may use any number of services, and the four services 110a-110d are used for illustrative purposes only. In some implementations, an application may use one or more of the services to process or display data as part of an integrated computing process that involves both the application and the one or more services.

The application 105 specifies an interface to each type of service to be used that indicates how the application 105 desires to use each type of service. The services 110a-110d may each be of different types, so the application 105 may be said to specify an interface to each of the services 110a-110d. In other words, the interfaces defined by the application 105 specify the desired input/output relationships between the application 105 and the services 110a-110d. For example, the service 110a may be a master data management service, which is used to manage master data objects, or data that are created, revised or deleted by the application 105. Often, a master data object refers to a principal entity used in the application 105. Examples of master data objects include, but are not limited to, a product object, an employee object, a customer object, or a business partner object. The application 105 may specify in the interface to the service 110a that, when the application 105 provides the service 110a with an identifier of master data managed by the service 110a, the service 110a provides the master data to the application 105. Each of the input/output relationships may be specified in the interface as a method that may be called by one of the services 110a-110d. Inputs to the method may be what are provided to the service by the application 105 as part of the corresponding input/output relationship, and outputs of the method may be what are provided in return to the application 105 as part of the corresponding input/output relationship. Each of the interfaces may specify multiple input/output relationships between the application 105 and one of the services 110a-110d. The input/output relationships specified by the application 105 are independent of the specific implementations of the services 110a-110d.

Each of the service adapters 115a-115d implements one of the interfaces to the services 110a-110d that has been specified by the application 105. For example, the service adapter 115a implements the interface to the service 110a, the service adapter 115b implements the interface to the service 110b, the service adapter 115c implements the interface to the service 110c and the service adapter 115d implements the interface to the service 110d. Therefore, each of the services 110a-110d corresponds to one of the service adapters 115a-115d.

Each service adapter implements the input/output relationships or the methods specified in the interface to the corresponding service. The implementations of the methods specify how the inputs received from the application 105 are used by the corresponding service to produce the outputs. The implementations may process the inputs received from the application 105 into a form that is usable by the corresponding service before passing the processed inputs to the corresponding service. Likewise, the implementations may process the outputs received from the corresponding service into a form that is usable by the application 105. In other words, the implementation may process the inputs received from the application 105 and the outputs sent to the application 105 such that the inputs and the outputs match what is specified in the corresponding input/output relationships.

The service adapters 115a-115d may be included in the adapter manager 120. The adapter manager 120 maintains indications of services that are available to the application 105 and of the service adapters that correspond to the available services. For example, the adapter manager 120 may maintain a registry or table that maps the available services to the corresponding service adapters. The adapter manager 120 may provide an appropriate service adapter to the application 105 in response to a request for the type of the corresponding service from the application 105. For example, the application may request to use a particular type of service, and the service 110b may be of the particular type. The application may identify the particular type of service by name, service type identifier or other type of identifier. In response, the adapter manager 120 provides the application 105 with the service adapter 115b to enable the application 105 to use the service 110b. The adapter manager 120 may be configured at configuration time or at design time to include information describing services that are available to the application 105 and the service adapters that correspond to the available services. Configuration time refers to the time at which information governing the operation of the adapter manager 120 is specified, and design time refers to the time at which the adapter manager 120 is designed. The information is used to identify an appropriate service adapter to be provided to the application 105 in response to a received request.

The service adapters 115a-115d provide application-independent access to the services 110a-110d. This access reduces the coupling of the application 105 to particular implementations of the services 110a-110d. This is particularly useful when it is not known what services will be available to the application 105 and when the application 105 needs to flexibly and adaptively interface with different implementations of a single type of service. The service adapters 115a-115d are interposed between the application program 105 and the services 110a-110d to enable the application program 105 to use the service 110a-110d as defined in the interface. The service adapters 115a-115d enable the services 110a-110d to be modified, maintained, or replaced without detection by the application program. In other words, the service adapters 115a-115d provide the application 105 with a stable interface to the services 110a-110d that does not depend on the specific implementation of the services 110a-110d. The adapter manager 120 enables easy exchange of services when environment changes or service changes occur.

Figure 1B:
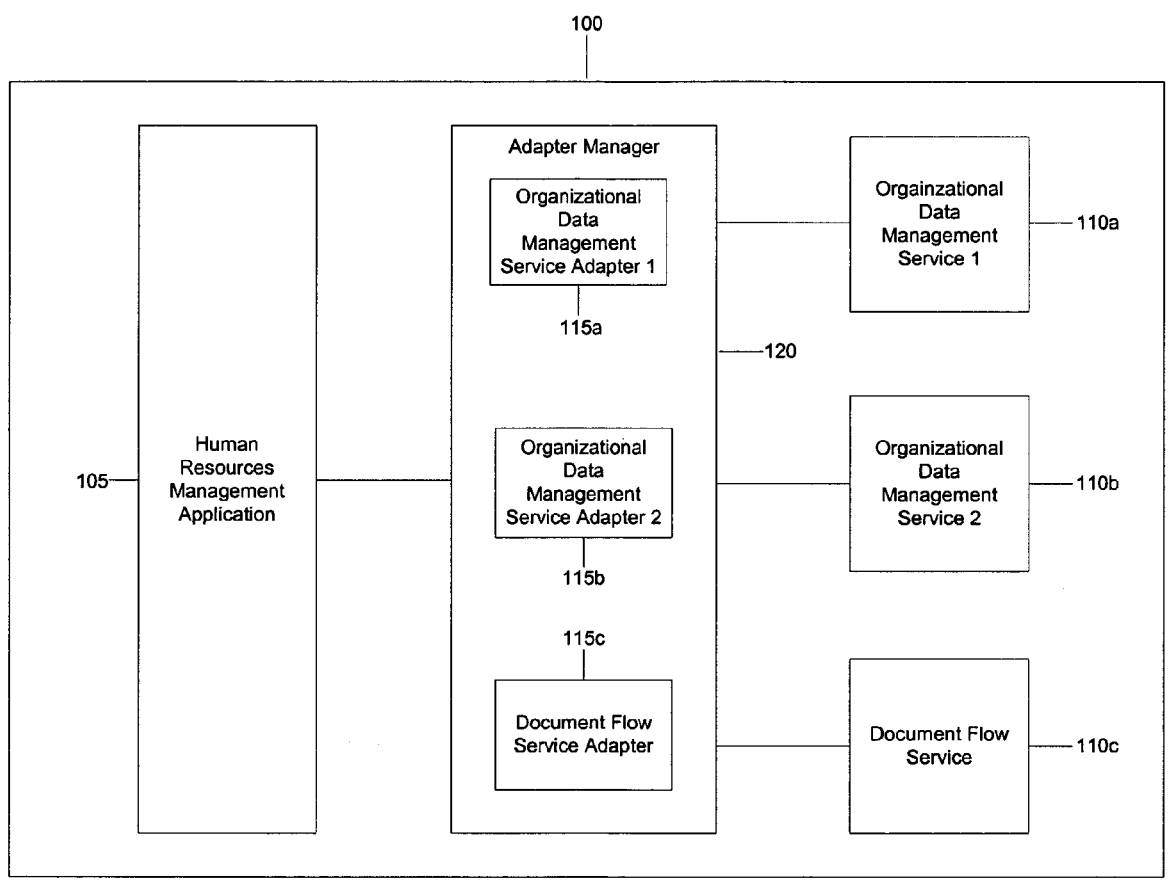
FIG. 1B is a block diagram of an exemplary computer system in which a human resources management application uses an organizational management data service and a document flow service.

FIG. 1B is block diagram of an exemplary computer system 100 in which a human resources management application program 105 is enabled to use services 110a-110c, each of which provides a service function to the human resources management application program 105. Service adapters 115a-115c enable the human resources management application program 105 to use the services 110a-110c, respectively. An adapter manager 120 controls and maintains the service adapters 115a-115c.

The human resources management application program 105 is used by a business enterprise to accomplish a business function related to human resources management. The services 110a and 110b are two implementations of an organizational data management service that may be used by the human resources management application program 105 to retrieve information describing the organizational structure of the business enterprise for use in accomplishing the business function. The service 110c is a document flow service that is used by the human resources management application program 105 to control the flow of documents related to the business function.

The human resources management application program 105 specifies interfaces to each type of service to be used to define how the human resources management application program 105 desires to use each type of service. Specifically, the human resources management application program 105 specifies a first application/service interface to organizational data management services, of which the services 110a and 110b are examples, and a second application service interface to document flow services, of which the service 110c is an example. The first application/service interface may indicate that one of the organizational data management services 110a and 110b is to send information describing a structural unit of the business enterprise to the human resources management application program 105 after receiving an identifier of the structural unit from the human resources management application program 105. The second application/service interface may indicate that the document flow service 110c is to send a document describing the employees of a structural unit of the business enterprise to the human resources management application program 105 after receiving an identifier of the structural unit from the human resources management application program 105.

The service adapters 115a-115c enable the human resources management application program 105 to indirectly use the services 110a-110c. The service adapters 115a and 115b implement the first application/service interface to enable the human resources management application program 105 to use the organizational data management services 110a and 110b, respectively. The service adapter 115c implements the second application/service interface to enable the human resources management application program 105 to use the document flow service 110c. In implementing the application/service interfaces, the service adapters 115a-115c use the services 110a-110c.

The adapter manager provides one of the service adapters 115a-115c to the human resources management application program 105 in response to a request for a service of one of the types of the services 110a-110c. For example, the human resources application program 105 may need to use a service that provides structural unit information, and the organizational data management services 110a and 110b may be examples of such a service. As a result, the adapter manager 120 returns one of the service adapters 115a or 115b to the application 105. Which one of the service adapters 115a and 115b is returned to the application may depend on which of the services 110a and 110b are available to the application 105. For example, if the service 110a is undergoing maintenance and is unavailable, the adapter manager 120 sends the service adapter 115b to the application so that the application 115b can use the service 110b to obtain the necessary structural unit information.

The application 105 uses the received service adapter 115b to obtain the necessary structural unit information. Specifically, the application 105 passes an identifier of the structural unit by calling a method of the first application/service interface on the service adapter 115b with the identifier as an argument to the method. Execution of the called method results in the execution of a method of the service 110b, which results in the necessary structural unit information being passed to the application 105.

While using the structural unit information, the application 105 may determine that a document describing the employees of the structural unit is needed. The application then initiates retrieval of the document by requesting a service that may perform document retrieval from the adapter manager 120, and the service 110c may be an example of such a service. In response to the request, the adapter manager 120 sends the service adapter 115c to the application 105, and the application 105 uses the service adapter 115c to obtain the document from the service 110c. The received document and structural unit information may be used by the application 105 to accomplish the business function related to human resources management.

Figure 2:
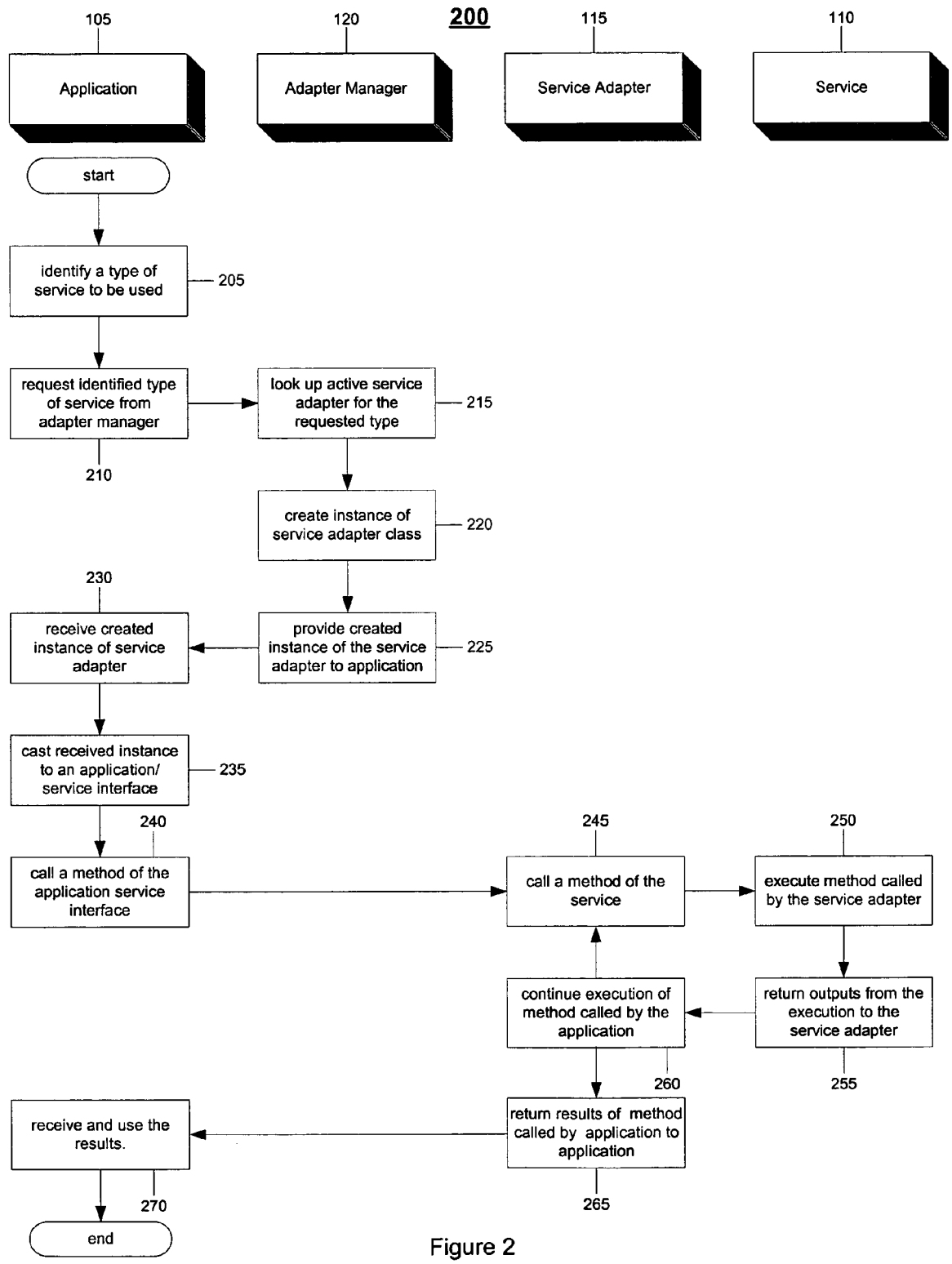
FIG. 2 is a flow chart of a process for enabling an application program to use a service.

FIG. 2 is a flow chart of a process 200 for enabling an application to use a service in a manner defined by the application. The process 200 is executed on an object-oriented implementation of the computer system 100 of FIG. 1A. The process 200 involves the application 105, the adapter manager 120, one of the service adapters 115a-115d (referred to as service adapter 115), and one of the services 110a-110d (referred to as service 110). The service adapter 115 implements an interface between the application 105 and the service 110 that has been specified by the application 105. The application 105 receives the service adapter 115 from the adapter manager 120 in response to a request to use a service of a type matching a type of the service 110, and the application 105 uses the received service adapter 115 to use the service 110.

The process 200 begins when the application 105 identifies a type of service to be used (step 205). During execution, the application 105 may need the results of a function that the application 105 is not configured to perform. To receive the necessary results, the application 105 may need to use a type of service that is configured to perform the function. The application 105 may identify such a service by querying an external computer program or system that is aware of the types of services that are available and the functions that those types of services may perform. For example, the application 105 may query the adapter manager 120 for an indication of a type of service that may perform the function, and the adapter manager 120 may provide such an indication to the application 105. Alternatively, an indication of the type of service that may perform the function may be specified in the application 105 itself. For example, the instructions executed by the application 105 may include an indication of the type of service. The indication of the type of service may be a name of the type of service, the function provided by the type of service, or the inputs and the outputs of the function.

The application 105 then requests the identified type of service from the adapter manager 120 (step 210). For example, the application 105 may send the indication of the type of service, whether it is the name of the service, the function provided by the service, or the inputs and outputs of the function, to the adapter manager 120. The requested type of service is a type of service for which the application 105 has specified an interface that defines how the application 105 desires to use services of the requested type, such as the service 110, to be provided with the function.

In response to the request, the adapter manager 120 looks up an active service adapter for a service of the requested type (step 215). A service adapter is called active when the corresponding service is available for use by the application 105. The adapter manager 120 maintains indications of active service adapters for services that are available to the application 105. In one implementation, the adapter manager 120 maintains a registry or a mapping from names of available types of services to names of active service adapters for services of the available types. In other implementations, the adapter manager 120 maintains similar mappings that relate functions provided by available types of services or inputs and outputs of functions provided by the available types of services to service adapters corresponding to available types. The active service adapters are implementations of interfaces to the available types of services that have been defined by the application 105.

The adapter manager 120 looks up the requested type of service to identify a corresponding active service adapter.

Identifying the corresponding service adapter includes identifying the class that implements the corresponding service adapter, which is, consequently, the class that implements the interface to the requested type of service that has been specified by the application 105. The adapter manager 120 then creates an instance of the identified service adapter (step 220). The created instance of the identified service adapter is the service adapter 115 that may be used by the application 105 to use the service 110. The adapter manager 120 provides the instance of the service adapter 115 to the application 105 (step 225).

The adapter manager 120 receives requests for multiple different types of services and provides multiple different types of service adapters. As such, the adapter manager 120 provides the instantiated service adapter 115 to the application 105 as a general object rather than as a specific type of service adapter, and the application 105 receives the service adapter 115 as a general object (step 230). In order to use the service adapter 115 to access the service 110 as defined in the interface, the application 105 casts the instance of the service adapter 115 from a general object to an instance of the interface (step 235). The application 105 is able to do so because the service adapter 115 is a type of the interface that corresponds to a requested type of service that was specified by the application 105. Because the service adapter 115 implements the interface between the application 105 and the service 110, the service adapter 115 is a subclass of the interface. The application 105 is programmed and designed to interact with the service 110 through the service adapter 115 according to the methods specified in the interface. In order to ensure that the methods are available to be called by the application 105 using the service adapter 115, the service adapter 115 is cast from a general object to an instance of the interface.

As the application 105 continues to execute, the application 105 calls a method of the interface on the service adapter 115 (step 240). Calling a method of the interface includes providing the service adapter 115 with the inputs needed by the method instructing the service adapter 115 to execute the method using the inputs. The method called by the application 105 is one of the methods specified in the interface to the service 110 that is implemented by the service adapter 115.

The service adapter 115 begins to execute the called method using the inputs received from the application 105. When executing the method, the service adapter may call a method of the service 110 (step 245). Calling a method of the service 110 may include forwarding one or more of the inputs received from the application 105 and instructing the service 110 to execute a method of the service 110 using the forwarded inputs. Before forwarding the inputs, the service adapter 115 may process the inputs into a form suitable for use by the service 110. Alternatively or additionally, the method of the service 110 may be executed using one or more inputs specified by the service adapter 115.

Upon receiving the inputs and the instructions to execute the method using the processed inputs from the service adapter 115, the service 110 does so (step 250). Any outputs generated by executing the method using the received inputs are returned to the service adapter 115 (step 255). The service adapter 115 receives the outputs and continues to execute the method called by the application (step 260). The continued execution of the method of the service adapter may include processing the outputs received from the service 110. Alternatively or additionally, the continued execution of the method of the service adapter may include calling another method of the service 110 (step 245). In such a case, the service 110 executes the method called by the service adapter 115 using inputs received from the service adapter (step 250), and then returns outputs of the execution of the method to the service adapter 115 (step 255).

In this manner, the service adapter 115 continues to execute the method called by the application 105, calling methods of the service 110 when necessary, until the execution is complete. Results of the complete execution of the method are forwarded to the application 105 (step 265). The results of the execution may be a processed form of the outputs of the methods of the service 110 that have been executed. The results of the execution are what the application 105 has been programmed and designed to receive and what has been specified as the outputs of the method in the interface to the service 110 that was defined by the application 105. The application 105 then receives and uses the results (step 270).

Figure 3:
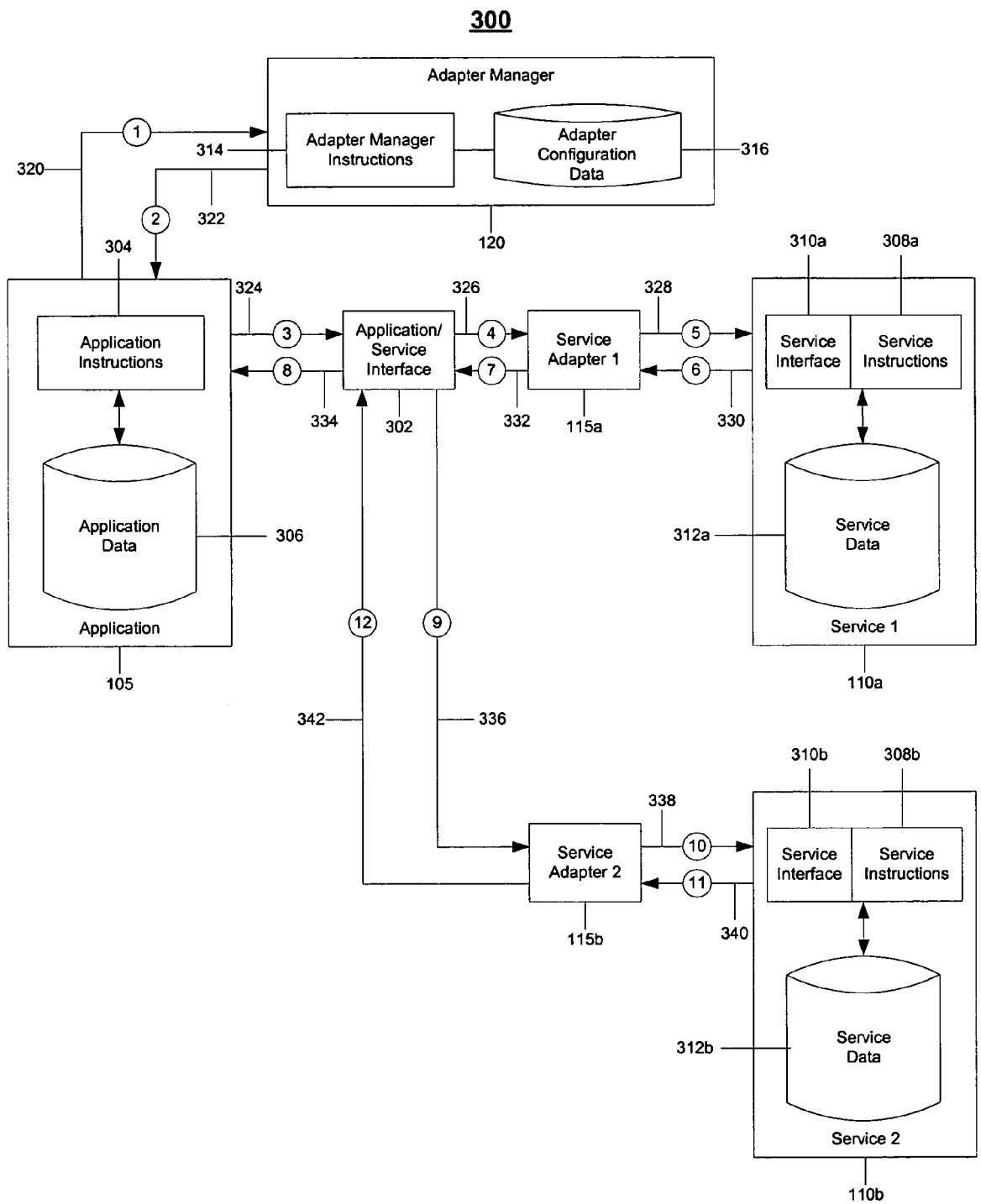
FIG. 3 is a block diagram of the components of a software architecture for enabling an application program to use a service.

FIG. 3 illustrates the components of a software architecture 300 for enabling an application to use a service. The software architecture 300 may be used to implement the process 200 of FIG. 2 and may be implemented on the computer system 100 of FIG. 1A. FIG. 3 also illustrates a process flow using components of the software architecture 300 to implement the process 200 of FIG. 2. The software architecture 300 includes an application 105, two services 110a and 110b, and two corresponding service adapters 115a and 115b. The software architecture 300 also includes an adapter manager 120 and an application/service interface 302.

The application 105 includes application instructions 304 and application data 306. The application instructions 304 are the instructions that are executed during the operation of the application 105, and the application data 306 are the data that are used during the operation of the application 105.

The service 110a, named "Service 1," and the service 110b, named "Service 2," represent two implementations of a single type of service. The services 110a and 110b include, respectively, service instructions 308a and 308b, service interfaces 310a and 310b, and service data 312a and 312b. The service instructions 308a and 308b are the instructions that are executed during the operation of the services 110a and 110b. The service interfaces 310a and 310b indicate how the services 110a and 110b may be used. More particularly, the service interfaces 310a and 310b specify one or more methods that may be called using the services 110a and 110b. The methods specified by the service interfaces 310a and 310b are implemented, respectively, in the service instructions 308a and 308b. The service data 318a and 318b include data that are used during operation of the services 110a and 110b.

The application/service interface 302 specifies how the application 105 desires to use the type of service of which the services 110a and 110b are examples. In other words, the application/service interface 302 specifies the input/output relationships between the application 105 and the services 110 and 110b. Because the services 110a and 110b are two implementations of a single type of service, only one application/service interface 302 is necessary to specify the common manner in which the application 305 desires to use the services 110a and 110b. Each of the input/output relationships may be specified in the application/service interface 302 as a method that may be called using the services 110a and 110b.

The service adapters 115a and 115b each implement the application/service interface 302. The service adapters 115a and 115b are used by the application 105 to indirectly use the services 110a and 110b, respectively. Specifically, the service adapter 115a enables the application to indirectly use the service 110a, and the service adapter 115b enables the application to indirectly use the service 110b. The implementations of the methods specified in the application/service interface 302 in the service adapter 115a include at least one call to a method specified in the service interface 310a and implemented in the service instructions 308a. The implementations of the methods specified in the application/service interface 302 in the service adapter 115b include at least one call to a method specified in the service interface 310b and implemented in the service instructions 308b. Therefore, the application 105 indirectly uses the services 110a and 110b by calling methods of the service adapters 115a and 115b.

The adapter manager 120 makes the service adapters 115a and 115b accessible to the application 105 such that the application 105 may use the service adapters 115a and 115b to use the services 110a and 110b. The service adapter includes adapter manager instructions 314 that are executed during operation of the adapter manager 120, and adapter configuration data 316 that includes data used during operation of the adapter manager 120. For example, the adapter configuration data 316 may include data describing the services that are available to the application 105 and the service adapters through which the application 105 may use those available services. In particular implementations, the data describing the available services may include data describing names of the available services, functions provided by the available services, and inputs and outputs of the provided functions. In implementations where the available services are requested by type, the data describing an available service may identify a type of the available service. The data describing the corresponding service adapters may include names of classes that implement the corresponding service adapters. The data included in the adapter configuration data 316 may be organized into a table that relates the data describing the available services to service adapters corresponding to the available services. The data included in the adapter configuration data 316 may be specified at configuration time or design time.

The service adapters 115a and 115b made accessible by the adapter manager 120 are provided to the application 105 in response to requests from the application 105 for types of services that include the services 110a and 110b. The requests may identify the types of services by name, by functions provided by member services, or by inputs and outputs of the provided functions. When a request for a type of service is received, the adapter manager 120 uses the identification of the type of service in the request to identify an active service adapter corresponding to a service of the requested type of service, based on the data included in the adapter configuration data 316. The identified service adapter is provided to the application from which the request is received. For example, if a request for a type of service corresponding to the application/service interface 302 is received from the application 105, then the service adapter 115a may be identified as corresponding to a service of the requested type and may be provided to the application 105. Multiple services indicated in the adapter configuration data 316 may be of the requested type, in which case the adapter manager 120 chooses an appropriate service adapter to be provided to the application 105.

Execution of the application instructions 304 may call for a function that may be performed by a particular type of service, and the services 110a and 110b may be of the particular type. In order to use one of the service 110a and 110b to perform the function, the application 105 first requests the particular type of service from the adapter manager 120, as illustrated by process flow 320. The adapter manager 120 identifies the service 110a as available and of the requested type, and the service adapter 115a as corresponding to the service 110a, and returns an instance of the service adapter 115a, as illustrated by process flow 322. The adapter manager 120 may identify the service adapter to return to the application 105 based on the data included in the adapter configuration data 316. For example, the data in the adapter configuration data 316 may indicate that the service adapter 115a is to be provided to the application 105 in response to requests for a service of the particular type if the service 110a is available, and that the service adapter 115b is to be provided to the application 105 otherwise.

The application 105 casts the service adapter 115a to an instance of the application/service interface 302 and calls a method of the application/service interface 302 on the cast instance of the application/service interface 302, as illustrated by process flow 324. The method call is forwarded to the implementation of the method in the service adapter 115, as illustrated by process flow 326. Execution of the implementation of the called method results in the calling of one or more methods of the service 110a that are specified in the service interface 310a and implemented in the service implementation 308a, as illustrated by process flow 328. Execution of the methods of the service 110a may result in the generation of one or more outputs that are returned to the service adapter 115a, as illustrated by process flow 330. Execution of the method called by the application 105 continues with the outputs received from the service 110a until the execution is completed. Results of the complete execution are forwarded to the application/service interface 302, as illustrated by process flow 332, and the application/service interface 302 forwards the results to the application 105, as illustrated by process flow 334. Execution of the application instructions 304 continues, using the received results.

The continued execution of the application instructions 304 again may require the function provided by the particular type of service. In order to use a service of the particular type to perform the function, the application 105 first requests a service of the particular type from the adapter manager 120, as illustrated by process flow 320. At this point, the service 110a may be unavailable and the service 110b may be available. As such, the adapter manager 120 identifies the service 110b as available and of the requested type, identifies the service adapter 115b as corresponding to the service 110b, and returns an instance of the service adapter 115b, as illustrated by process flow 322.

The application 105 then uses the service adapter 115b to use the service 110b in a similar manner as the service adapter 115a was used to use the service 110a. More particularly, the application 105 casts the service adapter 115b to an instance of the application/service interface 302 and calls a method of the application/service interface 302 on the cast instance of the application/service interface 302, as illustrated by process flow 324. The method call is forwarded to the implementation of the method in the service adapter 115b, as illustrated by process flow 336.

Execution of the implementation of the called method results in the calling of one or more methods of the service 110b that are specified in the service interface 310b and implemented in the service implementation 308b, as illustrated by process flow 338. Execution of the methods of the service 110b results in the generation of one or more outputs that are returned to the service adapter 115b, as illustrated by process flow 340. Execution of the method called by the application 105 continues with the outputs received from the service 110b until the execution is completed. Results of the complete execution are forwarded to the application/service interface 302, as illustrated by process flow 342, and the application/service interface 302 forwards the results to the application 105, as illustrated by process flow 334. Execution of the application instructions 304 continues, using the received results. As illustrated in FIG. 3, in order to change the implementation of a type of service that is used by an application to perform a desired function, both the implementation of the service and the corresponding service adapter must be changed.

The application 105 may need to use the service 110b instead of the service 110a when the services 110a and 110b provide different functions. Alternatively, the application 105 may use the service 110b instead of the service 110a when the services provide the same function and when the service 110a is being modified, maintained, or replaced such that the service 110a is inaccessible to the application 105. The adapter manager may return the service adapter 115b to the application 105 based on the knowledge that the service 110b also may perform the desired function for the application 105. The adapter configuration data 316 of the adapter manager 120 may be modified to indicate that the service adapter 115b should be provided to the application 105 in response to a request for a type of service implemented by the services 110a and 110b because the service 110a is presently inaccessible to the application 105a.

For example, the service 110b may represent an extended version of the service 110a that has more functionality than the service 110a. In other words, between when the service 110a is used and when the service 110b is used, the application 105 may have been extended to require additional desired uses of the services 110a and 110b. The application/service interface 302 may be extended to reflect the additional desired uses. As a result, the service adapter 115a no longer implements the application service interface 302. The service adapter 115b, however, may have been implemented after the application/service interface 302 has been extended such that the service adapter 115b implements the extended application service/interface 302 using the service 110b. Therefore, in response to an extension to the application 105 and the application/service interface 302, the service adapter used by the application 105 and the corresponding service are replaced, and configuration data 316 in the adapter manager 120 is updated to reflect the replacement. In other situations, the application 105 may be extended to require the use of an unrelated service through a different application/service interface and service adapter.

Figure 4:
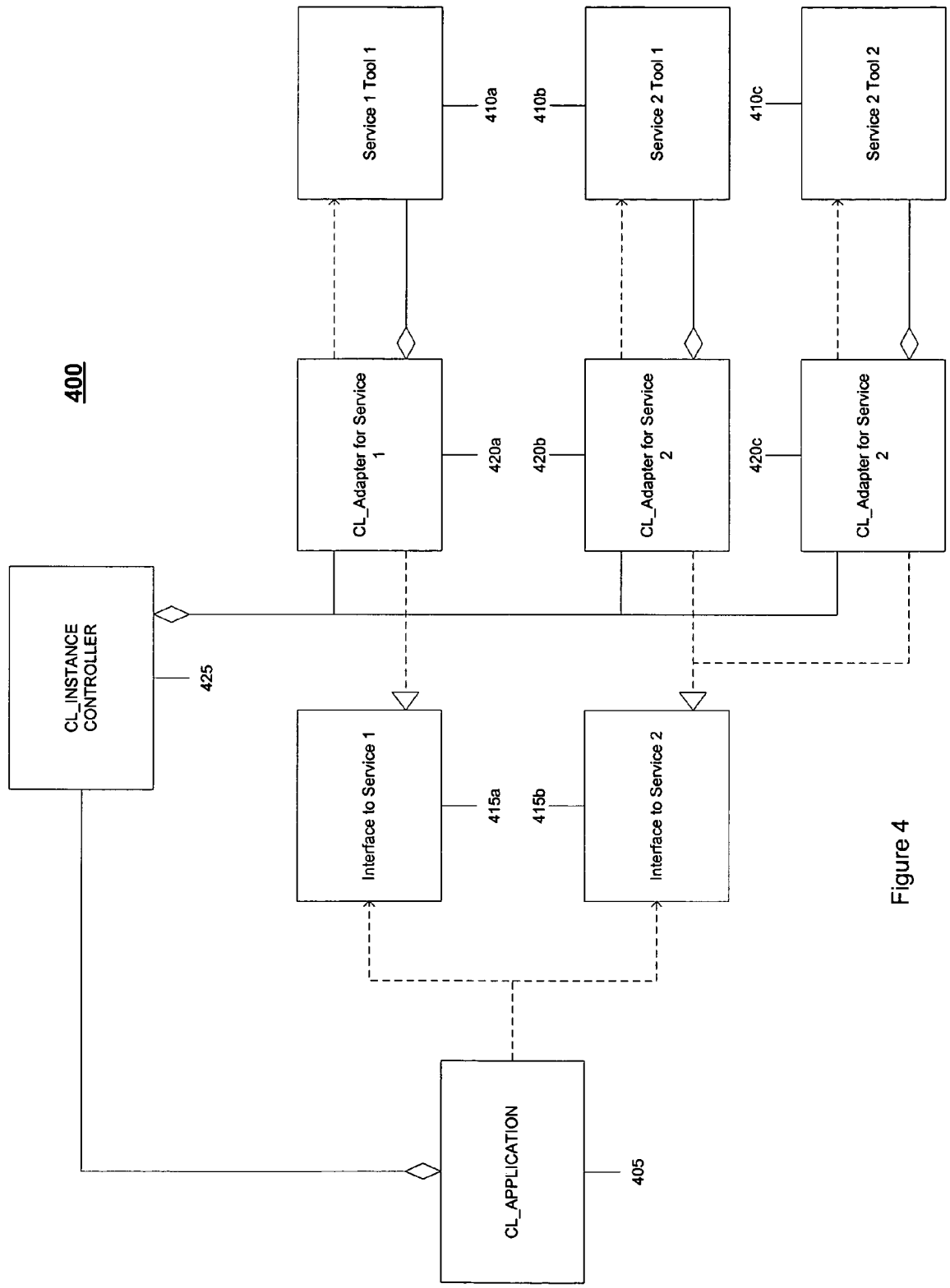
FIG. 4 is a class diagram of a software architecture for enabling an application program to use a service.

FIG. 4 is a class diagram 400 of a software architecture for enabling an application to use a service. The class diagram 400 includes an application class 405 that represents an application that uses services represented by service classes 410a-410c. Application/service interfaces 415a and 415b define the manner in which the application represented by the application class 405 accesses the services represented by the service classes 410a-410c. Service adapter classes 420a-420c implement the application/service interfaces 415a and 415b to enable the application to use the services as defined in the application/service interfaces 415a and 415b. An instance controller class 425 represents an adapter manager that manages the instances of the service adapter classes 420a-420c that are used by the application class 405.

The application class 405 implements an application, such as the application 105 of FIG. 1A, that is used by a business enterprise. Instances of the application class 405 use services to perform functions that are not implemented by the application class 405. The application class 405 may completely implement the application when instances of other classes are not used or included by the application class 405, as is illustrated in the class diagram 400. Alternatively, the application class 405 may be a top level or main class of the application that uses or includes instances of other classes to implement the application.

Similarly, the service classes 410a-410c implement services used by the application implemented by the application class 405, such as the services 110a-110d of FIG. 1A. The service classes 410a-410c may represent implementations of multiple types of services, multiple implementations of a single type of service, or some combination thereof. For example, in the class diagram 400, the service classes 410a-410c represent different implementations of two services. More particularly, the service class 410a implements a first service of a first type, and the service classes 410b and 410c each represent an implementation of a second service of a second type. Each implementation of a type of service may be referred to as a tool for the type of service. Therefore, the service class 410b implements a first tool for the second type of service, and the service class 410c implements a second tool for the second type of service. The service classes 410a-410c may completely implement the corresponding services when instances of other classes are not used by the service classes 410a-410c, as is illustrated in the class diagram 400. Alternatively, the service classes 410a-410c may be top level or main classes of the corresponding services that use or include instances of other classes to implement the corresponding services.

The application/service interfaces 415a and 415b define how the application class 405 may use the first service and the second service implemented by the service classes 410a-410c. One application/service interface is necessary for each type of service to be used by an application. In the illustrated example, the application/service interface 415a defines how the application class 405 may use services of the first type, such as the first service, and the application/service interface 415b defines how the application class 405 may use services of the second type, such as the second service. The application class 405 weakly depends on the application/service interfaces 415a and 415b, as illustrated by the dashed arrows between the application class 405 and the application/service interfaces 415a and 415b in the class diagram 400. In other words, instances of the application class 405 use instances of the application/service interfaces 415a and 415b to use the first service and the second service. More particularly, instances of the application class 405 call methods defined in the application/service interfaces 415a and 415b to indirectly use the first service and the second service.

The service adapter classes 420a-420c implement or realize the application/service interfaces 415a and 415b to produce service adapters, such as the service adapters 115a-115d of FIG. 1A, that enable the application to use the services. More particularly, the service adapter class 420a realizes the application/service interface 415a, as evidenced by the dashed arrow from the service adapter class 420a to the application/service interface 415a. The service adapter classes 420b and 420c realize the application/service interface 415b, as evidenced by the dashed arrows from the service adapter classes 420b and 420c to the application/service interface 415b. The dashed arrows between the service adapter classes 420a-420c are labeled with the number of service adapter classes used to implement the application/service interfaces 415a and 415b.

Each of the service adapter classes 420a-420c weakly depends on one of the service classes 410a-410c. In other words, the service adapter classes 420a-420c use methods from the service classes 410a-410c in implementing the application/service interfaces 415a and 415b. For example, the service adapter class 420a uses the service class 410a, as evidenced by the dashed arrow from the service adapter class 420a to the service class 410a. The service adapter class 420b uses the service class 410b, as evidenced by the dashed arrow from the service adapter class 420b to the service class 410b. The service adapter class 420c uses the service class 410c, as evidenced by the dashed arrow from the service adapter class 420c to the service class 410c. Therefore, the service adapters implemented by the service adapter classes 420a-420c are used by the application represented by the application class 405 to indirectly use the services represented by the service classes 410a-410c in a manner defined by the application in the application/service interfaces 415a and 415b.

In order to use each of the service classes 410a-410c, the service adapter classes 420a-420c include one of the service classes 410a-410c as part of the representation of the service adapter classes 420a-420c. More particularly, the service adapter classes 420a-420c include a reference to one of the service classes 410a-410c. For example, the service adapter class 420a includes a reference to the service class 410a, as evidenced by the solid connector between the service class 410a and the service adapter class 420a. The service adapter class 420b includes a reference to the service class 410b, as evidenced by the solid connector between the service class 410b and the service adapter class 420b. The service adapter class 420c includes a reference to the service class 410c, as evidenced by the solid connector between the service class 410c and the service adapter class 420c.

The instance controller class 425 implements an adapter manager that controls which instances of the service adapter classes 420a-420c are made accessible to the application implemented by the application class 405. For example, the instance controller class 425 may implement the adapter manager 120 of FIG. 1A. Each instance of the application class 405 includes one instance of the instance controller class 425, as evidenced by the solid connector labeled with two ones between the application class 405 and the instance controller class 425. The instance of the instance controller class 425 included in an instance of the application class 405 maintains indications of services and service adapters that are available to the instance of the application class 405 and provides the instance of the application class 405 with service adapters that correspond to requested types of services. As a result, the instance controller class 425 includes the service adapter classes 420a-420c, as evidenced by the solid connector between the service adapter classes 420a-420c and the instance controller class 425.

The services that provide service functions to application programs may use application programs to provide the service functions. The services define an interface to each type of used application program that specifies how the services desire to use each type of application programs. Application adapters implement the interfaces to enable the services to interact with the application programs in the desired manner. Therefore, services and application programs used by the services may have relationships similar to the relationships between application programs and services used by the application programs described above. Such relationships may be reflexive when an application program uses a service that uses the application program. Characteristics of relationships between services and application programs used by the services are analogous to characteristics of relationships between application programs and services used by the application programs. Therefore, the above description, which describes application programs using services, may be analogously applied to services using application programs.

Figure 5:
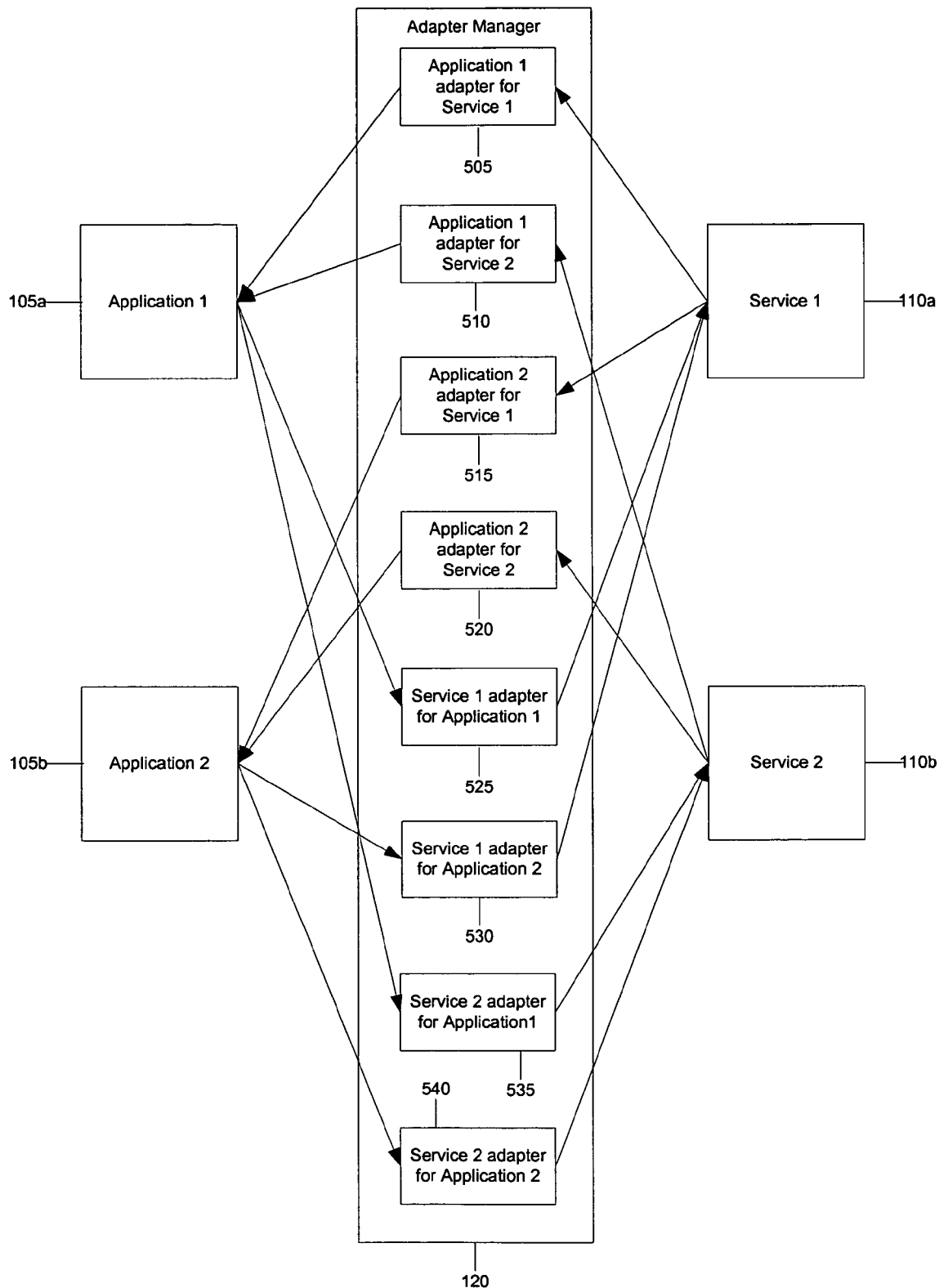
FIG. 5 is a block diagram of a framework for enabling application programs to use multiple services and for enabling services to use multiple application programs.

FIG. 5 is block diagram of a computer system 500 in which application programs 105a and 105b and services 110a and 110b are enabled to use one another. Each of the services 110a and 110b provides a specific function to the application programs 105a and 105b, and vice versa. An adapter manager 120 enables the application programs 105 and 105b and the services 110a 110b to use one another. The adapter manager 120 includes multiple application adapters 505-520 and service adapters 525-540 that enable the application programs 105a and 105b and the services 110a and 110b to use one another.

The application programs 105a and 105b, which are also referred to as applications, are computer programs or systems configured to perform a specific function. For example, the applications 105a and 105b may be used for similar functions as the application 105 of FIG. 1A. The functions provided by the applications 105a and 105b may be needed by a business enterprise that operates the applications 105a and 105b or by the services 110a and 110b. For example, one of the application programs 105a or 105b may be a back-end application.

Similarly, the services 110a and 110b are computer programs or systems that perform a specific function. For example, the services 110a and 110b may perform similar functions as the services 110a-110d of FIG. 1A. The functions provided by the services 110a-110b may be used by users that access the services or by the applications 105a and 105b. For example, one of the services 110a or 110b may be a web services program that accesses one of the applications 105a or 105b, which may be a backend application that provides additional functionality to the web services program.

Each of the applications 105a and 105b specify an interface to each type of service to be used, and the services 110a and 110b each correspond to a different type. Similarly, each of the services 110a and 110b specifies an interface to each type of application to be used, and the applications 105a and 105b each correspond to a different type. Therefore, an interface to a type of service specified by an application indicates how the application desires to use implementations of the type of service, and an interface to a type of application specified by a service indicates how the service desires to use implementations of the type of application. Therefore, each of the applications 105a and 105b may be said to specify an interface to each of the services 110a and 110b, and each of the services 110a and 110b may be said to specify an interface to each of the applications 105a and 105b.

The application adapters 505-520 implement the interfaces to the applications 105a and 105b that have been specified by the services 110a or 110b. More particularly, the application adapter 505 implements the interface to the application 105a that is specified by the service 110a, the application adapter 510 implements the interface to the application 105a that is specified by the service 110b, the application adapter 515 implements the interface to the application 105b that is specified by the service 110a, and the application adapter 520 implements the interface to the application 105b that is specified by the service 110b. The service adapters 525-540 implement the interfaces to the services 110a and 110b that have been specified by the applications 105a and 105b. More particularly, the service adapter 525 implements the interface to the service 110a that is specified by the application 105a, the service adapter 530 implements the interface to the service 110b that is specified by the application 105a, the service adapter 535 implements the interface to the service 110a that is specified by the application 105b, and the service adapter 540 implements the interface to the service 110b that is specified by the application 105b.

The adapters 505-540 may be included in the adapter manager 120. The adapter manager 120 maintains indications of applications and services that are available to the applications 105a and 105b and the services 110a and 110b and of the adapters that correspond to the available applications and services. The adapter manager 120 may provide appropriate adapters to the applications 105a and 105b and the services 110a and 110b in response to requests for the corresponding types of applications or services from the applications 105a and 105b and the services 110a and 110b. For example, the application 105a may request to use a type of service implemented by the service 110b, and the adapter manager 120 may provide the application 105a with the service adapter 535 to enable the application 105a to use the service 110b. As another example, the service 110b may request to use a type of application implemented by the application 105a, and the adapter manger 120 may provide the service 110b with the application adapter 510 to enable the service 110b to use the application 110a.

The application adapters 505-520 provide service independent access to the applications 105a and 105b. This access reduces the coupling of the services 110a and 110b to particular implementations of the applications 105a and 105b. This is particularly useful when it is not known what applications will be available to the services 110a and 110b and when the services 110a and 110b need to flexibly and adaptively interface with different implementations of a single application. The application adapters 505-520 are interposed between the services 110a and 110b and the applications 105a and 105b to enable the services 110a and 110b to use the applications 105a and 105b, as defined in the interfaces. The application adapters 505-520 enable the applications 105a and 105b to be modified, maintained, or replaced without detection by the services 110a and 110b. In other words, the application adapters 505-520 provide the services 110a and 110b with a stable interface to the applications 105a and 105b that does not depend on the specific implementation of the applications 105a and 105b. The adapter manager 120 enables easy exchange of applications when environment changes or service changes occur.

Figure 6:
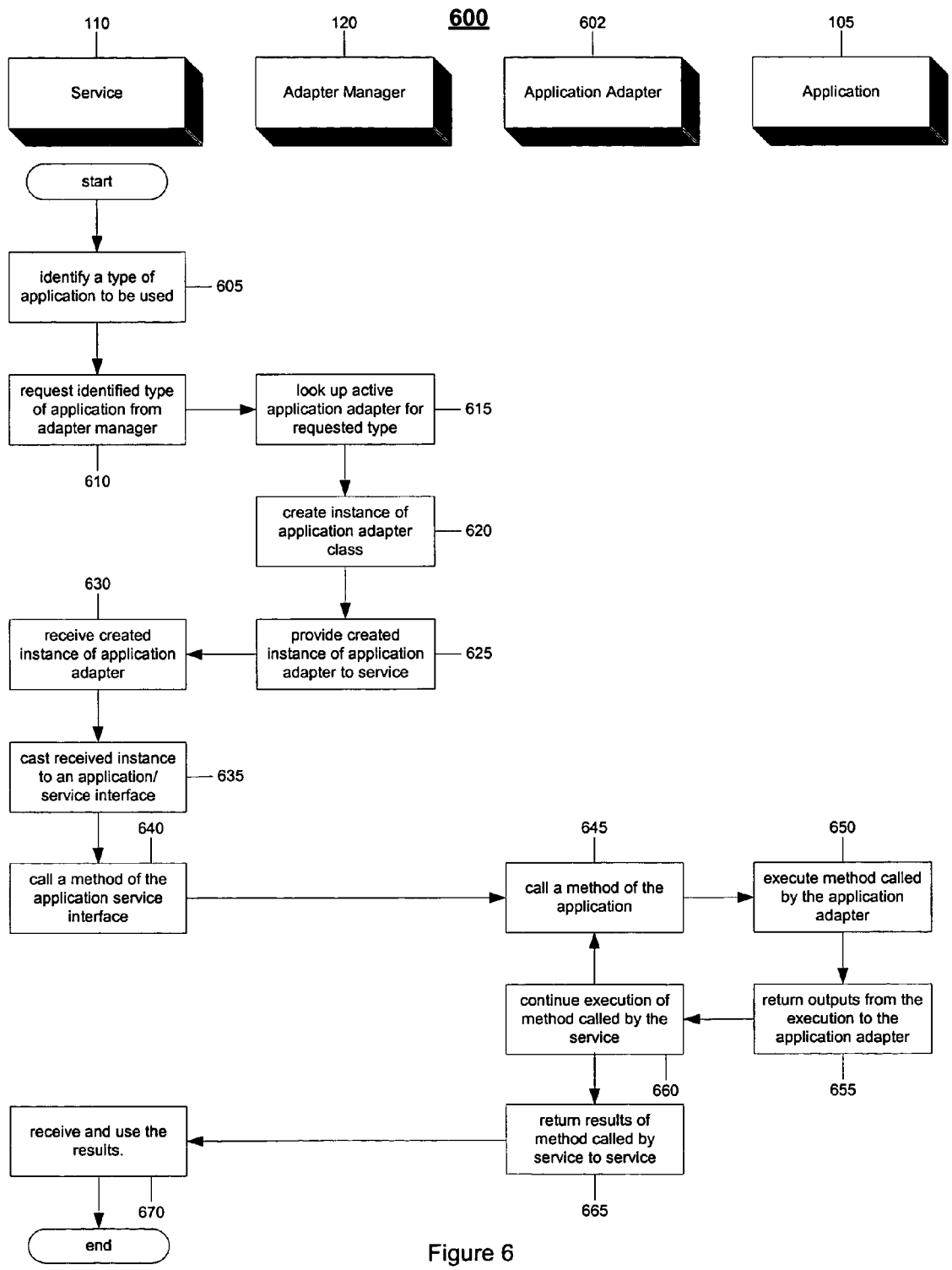
FIG. 6 is a flow chart of a process for enabling a service to use an application program.

Turning now to how a service may use an interface defined by the service to access an application, FIGS. 6-9 illustrate the provision and use of an application adapter that implements the interface to the application. In contrast to the process 200 of FIG. 2 that enables an application to use a service, FIG. 6 is a flow chart of a process 600 for enabling a service to use an application in a manner defined by the service. The process 600 is executed on an object-oriented implementation of the computer system 500 of FIG. 5. The process 600 involves one of the services 110a and 110b (referred to as service 110), the adapter manager 120, one of the application adapters 505-520 (referred to as application adapter 602), and one of the applications 105a and 105b (referred to as application 105). In general, the application adapter 602 implements an interface between the service 110 and the application 105 that has been specified by the application 105. The service 110 receives the application adapter 602 from the adapter manager 120 in response to a request to use a type of application implemented by the application 105, and the service 110 uses the received application adapter 602 to use the application 105. This is similar to the process 200 by which an application accesses a service by means of a service adapter provided by an adapter manager.

More particularly, the process 600 begins when the service 110 identifies a type of application to be used (step 605). The service 110 requests the identified type of application from the adapter manager 120 (step 610). In response to the request, the adapter manager 120 looks up an active application adapter for an application of the requested type (step 615), creates an instance of the identified application adapter (step 620), and provides the application adapter 602 to the service 110 (step 625). Once the application 105 receives the instance of the application adapter (step 630), the service 110 casts the instance of the application adapter 602 to an instance of the interface (step 635).

As the service 110 continues to execute, the service 110 calls a method of the interface on the application adapter 602 (step 640), and the application adapter 602 begins to execute the called method using the inputs received from the service 110. When executing the method, the service adapter may call a method of the application 105 (step 645).

Upon receiving the inputs and the instructions to execute the method using the processed inputs from the application adapter 602, the application 105 does so (step 650). Any outputs generated by executing the method using the received inputs are returned to the application adapter 602 (step 655). The application adapter 602 receives the outputs and continues to execute the method called by the application (step 660). Alternatively or additionally, the continued execution of the method of the application adapter may include calling another method of the application 105 (step 645). In such a case, the application 105 executes the method called by the application adapter 602 using inputs received from the application adapter 602 (step 650), and then returns outputs of the execution of the method to the application adapter 602 (step 655).

In this manner, the application adapter 602 continues to execute the method called by the service 110, calling methods of the application 105 when necessary, until the execution is complete. Results of the complete execution of the method are forwarded to the service 110 (step 665). The service 110 then receives and uses the results (step 670).

Figure 7:
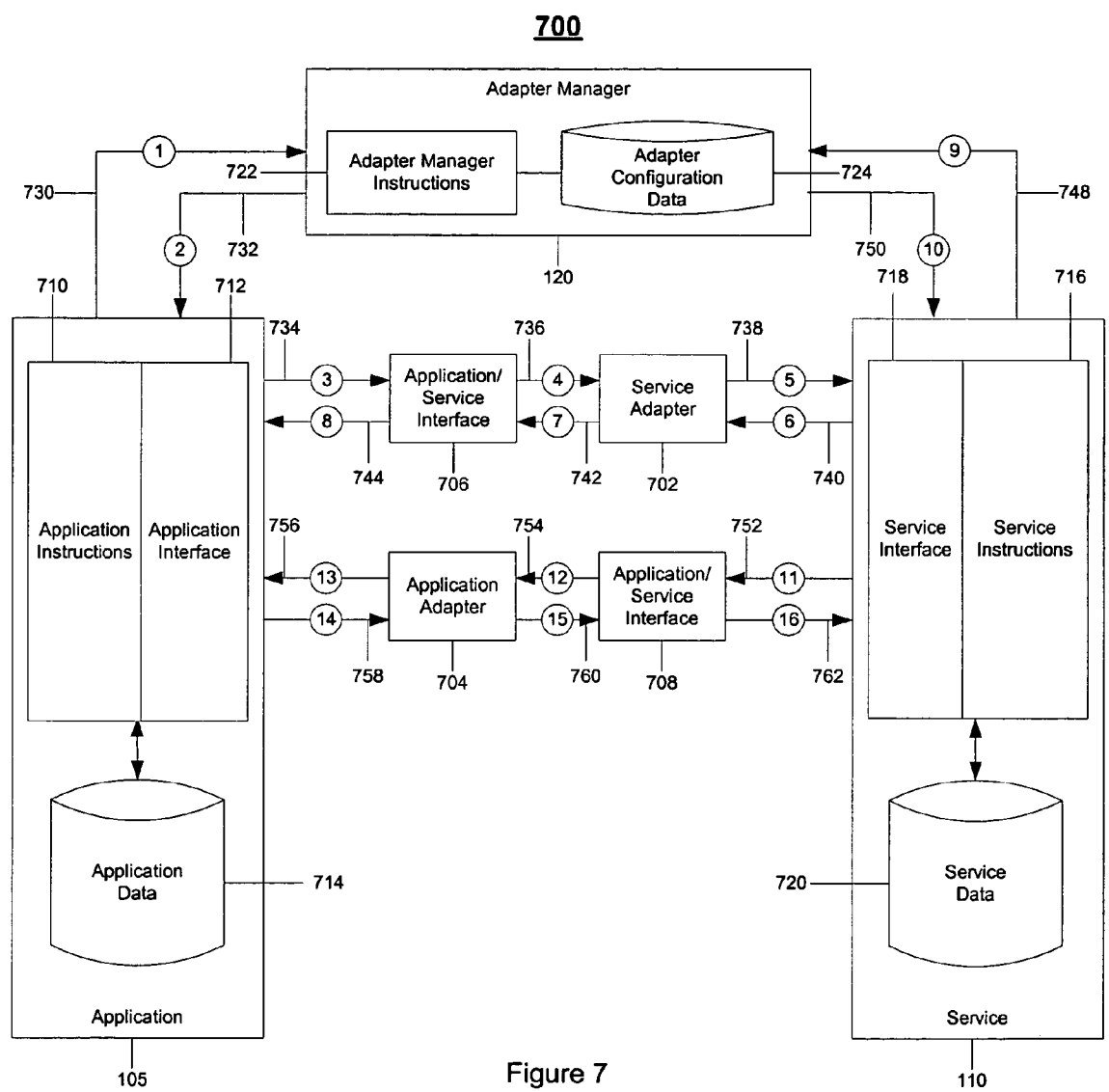
FIG. 7 is a block diagram of the components of a software architecture for enabling an application program to use a service and for enabling a service to use an application program.

FIG. 7 illustrates the components of a software architecture 700 for enabling an application to use a service and enabling a service to use an application. The software architecture 700 may be used to implement the process 200 of FIG. 2 and the process 600 of FIG. 6, and may be implemented on the computer system 500 of FIG. 5. FIG. 7 also illustrates a process flow using components of the software architecture 700 to implement the process 200 of FIG. 2 and the process 600 of FIG. 6. The software architecture 700 includes an application 105, a service 110, a service adapter 702, an application adapter 704, an adapter manager 120, and two application/service interfaces 706 and 708. In contrast to FIG. 3, FIG. 7 includes the application interface 712, the application adapter 704, and the application/service interface 708.

The application 105 includes application instructions 710, an application interface 712, and application data 714. The application instructions 710 are the instructions that are executed during the operation of the application 105. The application interface 712 indicates how the application 105 may be used by the service 110. More particularly, the application interface 712 may specify one or more methods that may be called using the application 105. The methods specified by the application interface 712 are implemented in the application instructions 710. The application data 714 are the data that are used during the operation of the application 105.

The service 110 includes service instructions 716, a service interface 718, and service data 720. The service instructions 716 are the instructions that are executed during the operation of the service 110. The service interface 718 indicates how the service 110 may be used by the application 105. More particularly, the service interface 718 may specify one or more methods that may be called using the service 110. The methods specified by the service interface 718 are implemented in the service instructions 716. The service data 720 includes data that are used during operation of the service 110.

The application/service interface 706 specifies how the application 105 desires to use the service 110. Similarly, the application service interface 708 specifies how the service 110 may access the application 105. The service adapter 702 implements the application/service interface 706, and the application adapter 704 implements the application/service interface 708. The implementation of the application/service interface 706 includes at least one call to a method specified in the service interface 718 and implemented in the service instructions 716. The implementation of the application/service interface 708 in the application adapter 704 includes at least one call to a method specified in the application interface 712 and implemented in the service instructions 710. Therefore, the application 105 indirectly uses the service 110 by calling methods of the service adapter 702, and the service 110 indirectly uses the application 105 by calling methods of the application adapter 704.

The adapter manager 120 makes the service adapter 702 accessible to the application 105 and the service 110 such that the application 105 may use the service adapter 702 to use the service 110. The adapter manager 120 also makes the application adapter 704 accessible to the service 110 such that the service 110 may use the application adapter 704 to use the application 105. The adapter manager 120 includes adapter manager instructions 722 that are executed during operation of the adapter manager 120, and adapter configuration data 724 that includes data used during operation of the adapter manager 120. For example, the adapter configuration data 724 may include data describing the services that are available to the application 105, the service adapters through which the application 105 may use those available services, the applications that are available to the service 110, and the application adapters through which the service 110 may use those available application. The data included in the adapter configuration data 724 may be organized into a table that relates the available applications and services to application and service adapters corresponding to the available applications and services.

The adapters 702 and 704 made accessible by the adapter manager 120 are provided to the application 105 and the service 110 in response to requests for a particular type of service implemented by the service 110 and for a particular type of application implemented by the application 105 from the application 105 and the service 110, respectively. When a request is received, the adapter manager 120 identifies the adapter corresponding to an application or service of the requested type, based on the data included in the adapter configuration data 724. The identified adapter is provided to the application or service from which the request is received.

The application 105 uses the service 110 in a manner illustrated by process flows 730-744 that is analogous to the manner in which the application 105 uses the service 110 that is illustrated by the process flows 320-334 of FIG. 3. Execution of the service instructions 716 may call for a function that may be performed by the application 105. In order to use the application 105 to perform the function, the service 110 first requests a type of application that is implemented by the application 105 from the adapter manager 120, as illustrated by process flow 748. The adapter manager 120 identifies the application 105 as available and of the requested type, and the application adapter 704 as corresponding to the application 105, and returns an instance of the application adapter 704, as illustrated by process flow 750. The service 110 casts the application adapter 704 to an instance of the application/service interface 708 and calls a method of the application/service interface 708 on the cast instance of the application/service interface 708, as illustrated by process flow 752. The method call is forwarded to the implementation of the method in the application adapter 704, as illustrated by process flow 754. Execution of the implementation of the called method results in the calling of one or more methods of the application 105 that are specified in the application interface 712 and implemented in the application implementation 710, as illustrated by process flow 756. Execution of the methods of the application 105 may result in the generation of one or more outputs that are returned to the application adapter 702, as illustrated by process flow 758. Execution of the method called by the service 110 continues with the outputs received from the application 105 until the execution is completed. Results of the complete execution are forwarded to the application/service interface 708, as illustrated by process flow 760, and the application/service interface 708 forwards the results to the service 110, as illustrated by process flow 762. Execution of the service instructions 716 continues, using the received results.

Figure 8:
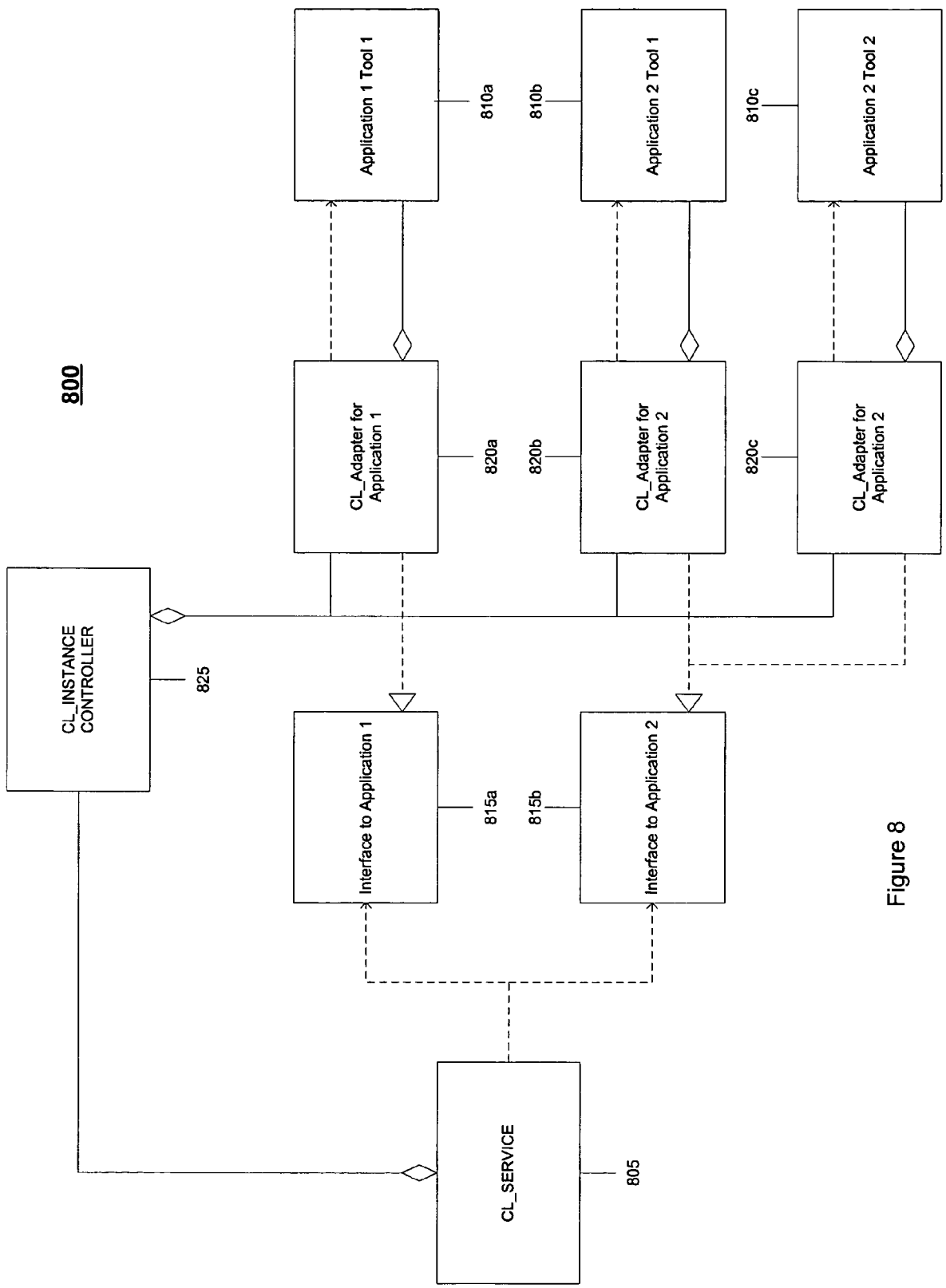
FIG. 8 is a class diagram of a software architecture for enabling a service to use an application program.

FIG. 8 is a class diagram 800 of a software architecture for enabling a service to use an application. The class diagram 800 includes a service class 805 that represents a service that uses applications represented by application classes 810a-810c. Application/service interfaces 815a and 815b define the manner in which the service represented by the service class 805 accesses the applications represented by the application classes 810a-810c. Application adapter classes 820a-820c implement the application/service interfaces 815a and 815b to enable the service to use the applications as defined in the application/service interfaces 815a and 815b. An instance controller class 825 represents an adapter manager that manages the instances of the application adapter classes 820a-820c that are used by the service class 805.

The service class 805 is analogous to the application class 405 of FIG. 4, the application classes 810a-810c are analogous to the service classes 410a-410c of FIG. 4, the application/service interfaces 815a and 815b are analogous to the application/service interfaces 415a and 415b, the application adapter classes 820a-820c are analogous to the service adapter classes 420a-420c of FIG. 4, and the instance controller class 825 is analogous to the instance controller class 425 of FIG. 4. Relationships between the classes 805-825 in the class diagram 800 are similar to the relationships between the analogous classes from the class diagram 400 of FIG. 4.

Figure 9:
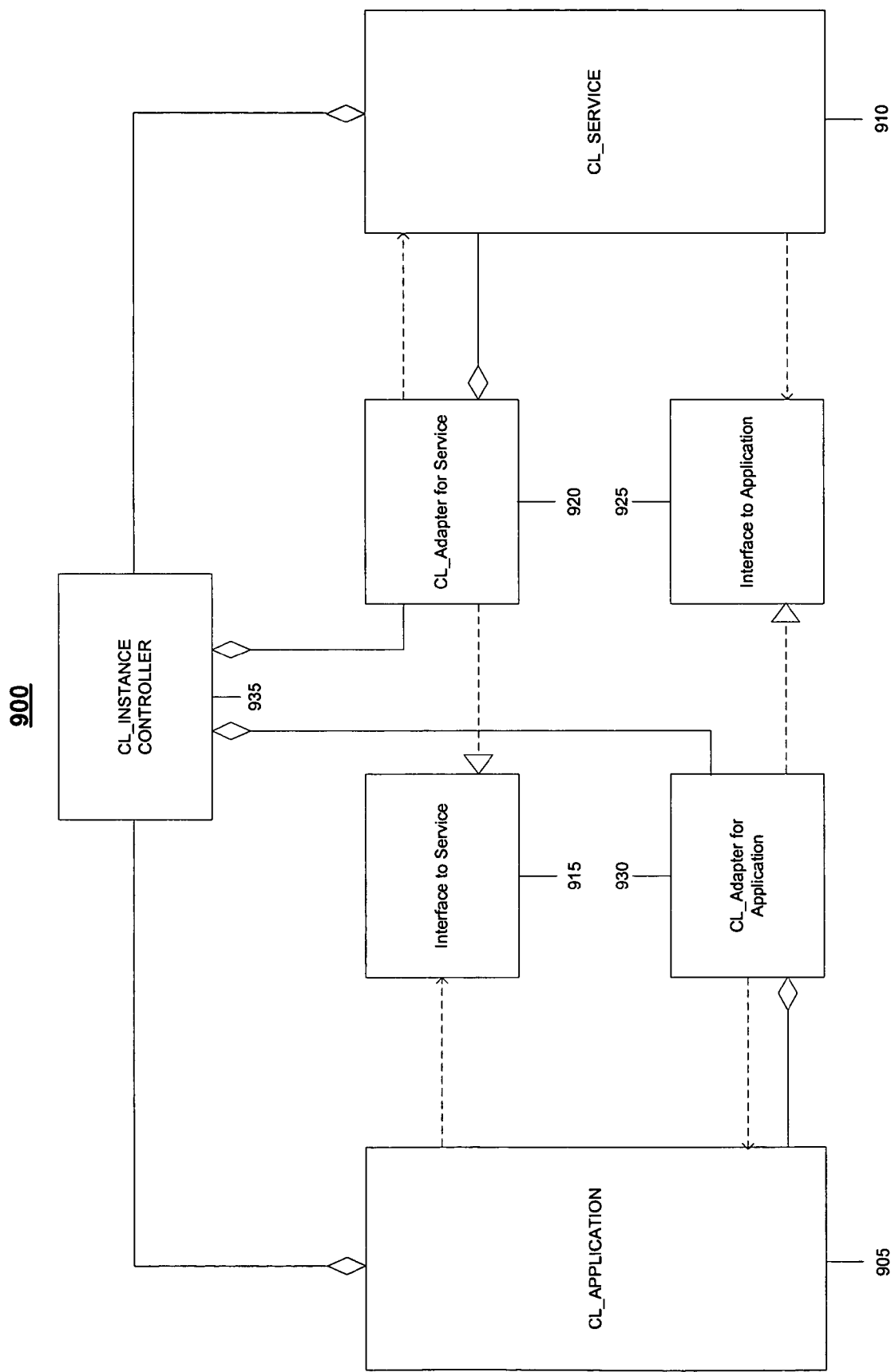
FIG. 9 is a class diagram of a software architecture for enabling an application program to use a service and for enabling a service to use an application program.

FIG. 9 is a class diagram 900 of a software architecture for enabling an application to use a service and for enabling a service to use an application. The class diagram 900 includes an application class 905 that represents an application the uses a service represented by a service class 910. The service represented by the service class 910 also uses the application represented by the application class 905. An application/service interface 915 defines the manner in which the application accesses the service, and a service adapter class 920 implements the application/service interface 915 to enable the application to use the service as defined in the application/service interface 915. An application/service interface 925 defines the manner in which the service accesses the application, and an application adapter class 930 implements the application/service interface 925 to enable the service to use the application as defined in the application/service interface 925. An instance controller class 935 represents an adapter manager that manages the instances of the service adapter class 920 that are used by the application class 905 and instances of the application adapter class 930 that are used by the service class 910.

The application class 905 is analogous to the application classes 405 of FIG. 4 and 810a-810c of FIG. 8. The service class 910 is analogous to the service classes 410a-410c of FIG. 4 and 805 of FIG. 8. The application/service interface 910 is analogous to the application/service interfaces 415a and 415b of FIG. 4. The application/service interface 915 is analogous to the application/service interfaces 815a and 815b of FIG. 8. The service adapter class 925 is analogous to the service adapter classes 420a-420c of FIG. 4. The application adapter class 930 is analogous to the application adapter classes 820a-820c of FIG. 8. The instance controller class 935 is analogous to the instance controller classes 425 of FIG. 4 and 825 of FIG. 8. Relationships between classes in the class diagram 900 are similar to the relationships between the analogous classes from the class diagrams 400 of FIG. 4 and 800 of FIG. 8. In general, the class diagram 900 is a combination of the class diagrams 400 and 800.

The techniques described above can be implemented in digital electronic circuitry, or in computer hardware, firmware, software, or in combinations of them. The techniques can be implemented as a computer program product (i.e., a computer program tangibly embodied in an information carrier, such as a machine-readable storage device, or in a propagated signal, for execution by, or to control the operation of, data processing apparatus, such as a programmable processor, a computer, or multiple computers). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Steps of the techniques can be performed by one or more programmable processors executing a computer program to perform functions of the techniques by operating on input data and generating output. Steps can also be performed by, and apparatus can be implemented as, special purpose logic circuitry, such as an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as magnetic disks, magneto-optical disks, or optical disks. Information carriers suitable for embodying computer program instructions and data include all forms of non-volatile memory, including by way of example semiconductor memory devices such as EPROM, EEPROM, and flash memory devices; magnetic disks such as internal hard disks or removable disks; magneto-optical disks; and CD-ROM and DVD-ROM disks. The processor and the memory can be supplemented by, or incorporated in, special purpose logic circuitry.

A service adapter has been used throughout to implement an interface between an application and a service to be used by the application that has been defined by the application to enable the application to use the service. However, the service itself may implement the interface between the application and the service, which allows the application to directly use the service. Similarly, an application adapter has been used throughout to implement an interface between a service and an application to be used by the service that has been defined by the service to enable the service to use the application. However, the application itself may implement the interface between the application and the service, which allows the service to directly use the application.

The techniques and concepts have been described with respect to an object-oriented implementation. The described techniques and concepts may be applicable to contexts that use other types of programming techniques. For example, an application may define an interface to a type of service where the application does not use an object-oriented approach and a service adapter may implement the interface to enable the application to access an implementation of a service that is not object-oriented.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer program product tangibly embodied in an information carrier, the computer program product including instructions that, when executed, cause an interface handling component to perform operations comprising providing an adapter to a first computer application for use in accessing a second computer application, the second computer application being operable to provide a function to the first computer application, wherein:

the adapter 1) is associated with the second computer application, 2) accepts, from the first computer application, one or more inputs to the function, 3) provides, to the second computer application, the one or more inputs in a form that the second computer application is able to use, 4) receives, from the second computer application, one or more outputs from the function, and 5) provides, to the first computer application, the one or more outputs in a form that the first computer application is able to use;

the one or more inputs to the function and the one or more outputs from the function are defined by the first computer application; and the adapter is provided to the first computer application based on an association of the first computer application with the function.

2. The computer program product of claim 1 wherein:
the adapter comprises a service adapter;
the function comprises a type of service;
the first computer application comprises an end-user application that is operable to receive inputs from a user; and
the second computer application comprises a service that is operable to receive inputs only from another computer application.

3. The computer program product of claim 1 wherein:
the adapter comprises an application adapter;
the first computer application comprises a service that is operable to receive inputs only from another computer application; and
the second computer application comprises an end-user application that is operable to receive inputs from a user.

4. The computer program product of claim 1 wherein the first computer application and the second computer application both are part of an integrated computing process.

5. The computer program product of claim 1 wherein the adapter is provided to the first computer application in response to a request from the first computer application for the function.

6. The computer program product of claim 5 wherein the request from the first computer application for the function comprises a request from the first computer application for a function identified by a function identifier.

7. The computer program product of claim 5 wherein the request from the first computer application for the function comprises a request from the first computer application for a function identified by the one or more inputs to the function and the one or more outputs from the function.

8. The computer program product of claim 1 wherein the first computer application defines the one or more inputs to the function and the one or more outputs from the function as an interface for the function.

9. The computer program product of claim 1 wherein the instructions, when executed, further cause the interface handling component to provide a second adapter to the first computer application, wherein:
    the second adapter 1) is associated with a third computer application, 2) accepts, from the first computer application, the one or more inputs to the function, 3) provides, to the third computer application, the one or more inputs in a form that the third computer application is able to use, 4) receives, from the third computer application, the one or more outputs from the function, and 5) provides, to the first computer application, the one or more outputs in a form that the first computer application is able to use; and
    the second adapter is provided to the first computer system based on an association of the first computer system with the function.

10. The computer program product of claim 1 wherein:
    the second computer application is one of multiple computer applications operable to provide the function; and
    the instructions, when executed, further cause the interface handling component to provide the adapter to the first computer system in lieu of a second adapter associated with a third computer application operable to provide the function.

11. The computer program product of claim 1 wherein:
    the instructions, when executed, cause the interface handling component to provide a generic adapter to the first computer application, and
    the first computer application is operable to transform the generic adapter to an interface such that the first computer application is able to use the transformed adapter to access the second computer application.

12. The computer program product of claim 11 wherein the first computer application is operable to transform the generic adapter by casting an adapter based on a generic adapter object to an adapter object such that the first computer is able to use the cast adapter object to access the second computer application.

13. A method for enabling communication between multiple computer applications, the method comprising:
    providing an adapter to a first computer application for use in accessing a second computer application, the second computer application being operable to provide a function to the first computer application, wherein:
    the adapter 1) is associated with the second computer application, 2) accepts, from the first computer application, one or more inputs to the function, 3) provides, to the second computer application, the one or more inputs in a form that the second computer application is able to use, 4) receives, from the second computer application, one or more outputs from the function, and 5) provides, to the first computer application, the one or more outputs in a form that the first computer application is able to use;
    the one or more inputs to the function and the one or more outputs from the function are defined by the first computer application; and
    the adapter is provided to the first computer application based on an association of the first computer application with the function.

14. The method of claim 13 wherein:
    the adapter comprises a service adapter;
    the function comprises a type of service;
    the first computer application comprises an end-user application that is operable to receive inputs from a user; and
    the second computer application comprises a service that is operable to receive inputs only from another computer application.

15. The method of claim 13 wherein:
    the adapter comprises an application adapter;
    the first computer application comprises a service that is operable to receive inputs only from another computer application; and
    the second computer application comprises an end-user application that is operable to receive inputs from a user.

16. The method of claim 13 wherein the first computer application and the second computer application both are part of an integrated computing process.

17. The method of claim 13 wherein the adapter is provided to the first computer application in response to a request from the first computer application for the function.

18. The method of claim 17 wherein the request from the first computer application for the function comprises a request from the first computer application for a function identified by a function identifier.

19. The method of claim 17 wherein the request from the first computer application for the function comprises a request from the first computer application for a function identified by the one or more inputs to the function and the one or more outputs from the function.

20. The method of claim 13 wherein the first computer application defines the one or more inputs to the function and the one or more outputs from the function as an interface for the function.

21. The method of claim 13 further comprising providing a second adapter to the first computer application, wherein:
    the second adapter 1) is associated with a third computer application, 2) accepts, from the first computer application, the one or more inputs to the function, 3) provides, to the third computer application, the one or more inputs in a form that the third computer application is able to use, 4) receives, from the third computer application, the one or more outputs from the function, and 5) provides, to the first computer application, the one or more outputs in a form that the first computer application is able to use; and
    the second adapter is provided to the first computer system based on an association of the first computer system with the function.

22. The method of claim 13, wherein the second computer application is one of multiple computer applications operable to provide the function, further comprising providing the adapter to the first computer system in lieu of a second adapter associated with a third computer application operable to provide the function.

* * * * *